F. G. Abbey.
Cheese-Curd Cutter.
Nº 44,058. Patented Sep. 6, 1864.

Witnesses
Wm. F. McNamara
J. P. Hall.

Inventor.
F. G. Abbey
per Munn & Co.
Attorneys.

UNITED STATES PATENT OFFICE.

F. G. ABBEY, OF SANDISFIELD, MASSACHUSETTS.

CURD-CUTTER.

Specification forming part of Letters Patent No. 44,058, dated September 6, 1864.

*To all whom it may concern:*

Be it known that I, F. G. ABBEY, of Sandisfield, in the county of Berkshire and State of Massachusetts, have invented a new and Improved Machine for Cutting Cheese-Curd; and I do hereby declare that the following is a full, clear, and exact description thereof, which will enable others skilled in the art to fully understand and construct my invention, reference being had to the accompanying drawings, forming a part of this specification, in which—

Figure 2:
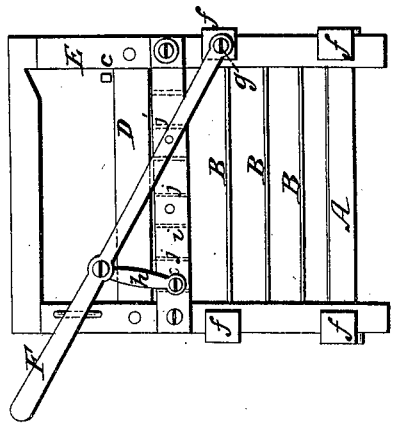
Figure 1:
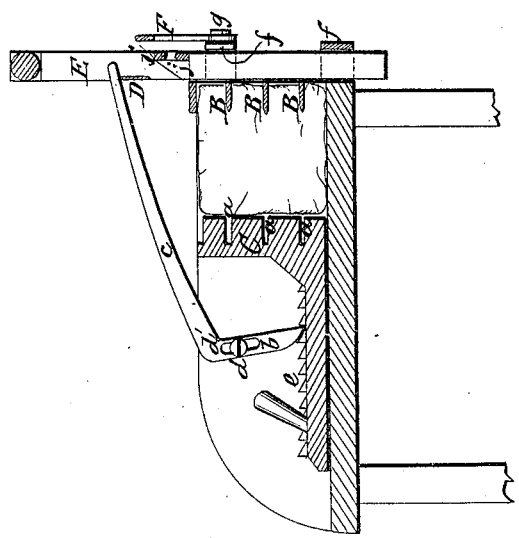

Figure 1 represents a longitudinal vertical section of my invention. Fig. 2 is a front elevation of the same.

Similar letters of reference indicate corresponding parts in the two figures.

This invention consists in a feed-box provided with a series of stationary knives and with an automatically-feeding follower, in combination with a reciprocating gate containing two sets of knives, the cutting-edges of which are situated in planes at right angles to each other and to the cutting-edges of the stationary knives in the feed-box in such a manner that by the action of the automatically-feeding follower the curd is forced through the stationary knives, and on passing these knives it is brought in contact with the knives in the reciprocating gate, and thus cut up in three different directions and in pieces of uniform size.

A represents the feed-box, made of wood or any other suitable material, similar to the feed-box of a fodder-cutter. This feed-box may be supported by legs or otherwise secured at a convenient height from the floor, and it is provided with a series of horizontal knives, B, the blades of which are secured, one above the other, in the front end or throat of said feed-box. The cutting-edges of the knives B point toward the follower C, which is fitted in the feed-box, having notches $a$ in its face to receive the knives B as it moves forward. Said follower is moved automatically toward the front end of the feed-box by the action of an elbow-lever, $b$ $c$, which is secured to the side of the box by a pivot, $d$, passing through a slot, $d$. The point of the short arm $b$ of this elbow-lever engages with the teeth of a serrated rack, $e$, which is rigidly attached to the follower C, and its long arm $c$ extends beyond the front edge of the feed-box, and is actuated by the transverse knife D, which is secured in the reciprocating gate E, so that its cutting-edge points down, as clearly shown in Fig. 1 of the drawings. The gate E is guided in its up-and-down motion by angular brackets $f$, which are secured to the outside of the feed-box, and motion is imparted to it by a hand-lever, F, which is attached to one of the brackets $f$ by means of a pivot, $g$, and connects by a link, $h$, with a cross-bar, $i$, which is rigidly secured to the front side of the gate. It must be remarked, however, that instead of the hand-lever any other suitable device might be employed to impart motion to the gate instead of the hand-lever, and I do not want to confine myself to the precise construction hereinbefore described, and shown in the drawings. The gate E is armed with a series of longitudinal knives, $j$, which are secured to the cross-bar $i$, as clearly shown in Fig. 1 of the drawings. These knives are situated in planes at right angles to the planes of the horizontal knives B and the transverse knife D, and their points extend close to the backs of the horizontal knives, so that the curd, on being forced through between said horizontal knives, is exposed to the immediate action of the longitudinal knives, and, finally, as the downward motion of the gate proceeds the transverse knife D is brought into action, and by the combined action of the three sets of the knives the curd is cut up in cubes of convenient size.

The operation of cutting curd, which generally is performed by hand at a great loss of time, can be effected by the aid of my machine with the greatest ease and facility; and, furthermore, by my machine the curd is cut up in pieces of an uniform size, whereby the subsequent operations in the manufacture of cheese are considerably facilitated.

What I claim as new, and desire to secure by Letters Patent, is—

1. The feed-box A and automatically-feeding follower C, in combination with the three sets of knives B $j$ D, and reciprocating gate E, constructed and operating in the manner and for the purpose substantially as herein shown and described.

2. The employment or use for the purpose of cutting cheese-curd of three sets of knives situated in planes at right angles to each other, and operated substantially in the manner specified, or in any other equivalent manner to produce a like effect.

F. G. ABBEY.

Witnesses:
 GEO. A. SHEPARD,
 OLCOTT M. CORSE.